United States Patent [19]

Sasuta

[11] Patent Number: 5,423,066
[45] Date of Patent: Jun. 6, 1995

[54] METHOD OF RESPONDING TO RESOURCE REQUESTS IN A TRUNKED COMMUNICATION SYSTEM WITHOUT CALL-HANDOFF

[75] Inventor: Michael D. Sasuta, Mundelein, Ill.

[73] Assignee: Motorola, Inc., Schaumburg, Ill.

[21] Appl. No.: 980,884

[22] Filed: Nov. 24, 1992

[51] Int. Cl.⁶ .............................................. H04B 7/26
[52] U.S. Cl. .................................. 455/34.1; 455/54.2
[58] Field of Search ................... 455/33.1, 33.4, 34.1, 455/34.2, 54.1, 54.2, 53.1, 62, 67.1; 379/59

[56] References Cited

U.S. PATENT DOCUMENTS

| | | | |
|---|---|---|---|
| 5,134,709 | 7/1992 | Bi et al. | 455/33.1 |
| 5,140,695 | 8/1992 | Yasuda et al. | 455/34.1 |
| 5,274,842 | 12/1993 | Sasuta | 455/34.1 |

Primary Examiner—Reinhard J. Eisenzopf
Assistant Examiner—Chi H. Pham
Attorney, Agent, or Firm—James A. Coffing

[57] ABSTRACT

A radio communication system (200) having a communication site (203) provides communication services to a coverage area (201) surrounding the communication site (203). A plurality of service resources are allocated (318) among a plurality of communication units (205) located within the coverage area (201). A method of responding to a service request transmitted from a requesting communication unit includes the steps of determining (310) a nominal service duration, and estimating (312) an available site time value. A completion probability value can then be calculated (403) using these parameters. The completetion probability value is then used to determine (405–413) whether or not to allocate, to the requesting communication unit, a service resource corresponding to the requested service.

18 Claims, 3 Drawing Sheets

METHOD OF RESPONDING TO RESOURCE REQUESTS IN A TRUNKED COMMUNICATION SYSTEM WITHOUT CALL-HANDOFF

FIELD OF THE INVENTION

The present invention relates generally to trunked communication systems, and more particularly to such systems which do not have call-handoff capabilities.

BACKGROUND OF THE INVENTION

Trunked communication systems are well know in both the telephone and mobile radio communications art. In the latter system, a plurality of communication units share a limited number of communication resources. Examples of such resources include frequency division multiplex (FDM), frequency pairs, time division multiplex (TDM) time slots, etc. Generally, these communication resources are allocated among the plurality of communication units (e.g., mobile radios, portable radios, and consoles), which communication units require the use of a particular service (e.g., interconnect, group dispatch, and private) from time to time. Service resources are allocated by a communication resource allocator, located at the communication site, to requesting communication units.

FIG. 1 shows a typical trunked communication system 100. Coverage area 101 is serviced by communication site 103. That is, communication units 105, 107 request, and are allocated, service resources via communication site 103. Coverage area 109 represents the reduced coverage available for providing services to radios having less transmit power. For example, communication unit 105 might have a 10-watt nominal transmit power, while communication unit 107 might have only a 1.5-watt transmitter. Accordingly, services can be provided to communication unit 105 throughout larger coverage area 101 than can be provided to communication unit 107—whose coverage area is limited to coverage area 109.

The nominal service duration—an expected time required to complete a call or average call length for a particular service type—varies depending on the type of service, the type of data being exchanged by group members, and even the type of communication unit requesting the service. In a mobile environment, where communication units often travel about the coverage area, the expected service duration largely determines whether or not the requested service call will be completed before the unit travels outside the coverage area. That is, depending on the speed and direction that the mobile unit is traveling at the time the service request is made, the probability of completing the call on that service resource is widely variable. As a result, a communication unit may request, and be allocated, a service resource to initiate a call which cannot be completed before it has traveled outside the coverage area. For example, if the request was to initiate an interconnect voice call, the call will simply be dropped when the communication unit travels out of the coverage area (assuming that the system is not equipped with call-handoff capabilities). In this case, one of the parties would be burdened with the task of re-initiating the call.

Another, perhaps more serious, problem might arise in the instance of transmitting important data, from a terminal, fax machine, or the like. In this case the data may need to be entirely re-transmitted (e.g., re-keyed, resent fax) in order to complete the call. The foregoing examples are used to illustrate the short-comings of prior art trunked communication systems. Of course, the problem presented by an incomplete call may be little more than an annoyance to the user, but it is equally likely to be significant in terms of inefficient resource usage, and the impact on customer satisfaction.

Accordingly, there exists a need for a radio communication system which is not constrained by the aforementioned short-comings of the prior art. In particular, a system which takes into account an estimated probability of completing the call, in determining whether or not to allocate a service resource, would be an improvement over prior art communication systems.

DETAILED DESCRIPTION OF THE PREFERRED EMBODIMENT

The present invention encompasses a radio communication system which, before allocating a service resource, determines a relative likelihood that the call will be completed. In particular, the allocating communication site takes into account the requesting communication units location, speed and direction, along with unique signalling characteristics of the requesting communication unit or of the requested service activity, and uses this information to determine whether or not to grant the requested resource. By doing so, a system that employs the present invention can ensure a higher quality of service to the subscribers in the system. Additionally, such a system would not require a complex queuing scheme for those calls which are dropped before their completion.

Figure 1:
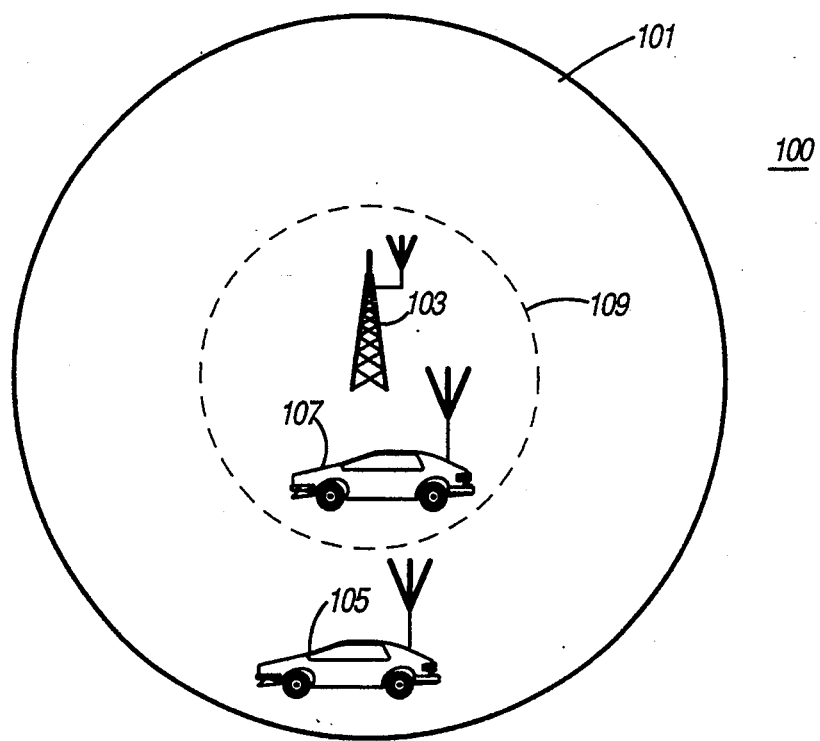
FIG. 1 shows a graphical representation of a typical trunked communication system, as is well known in the art.
Figure 2:
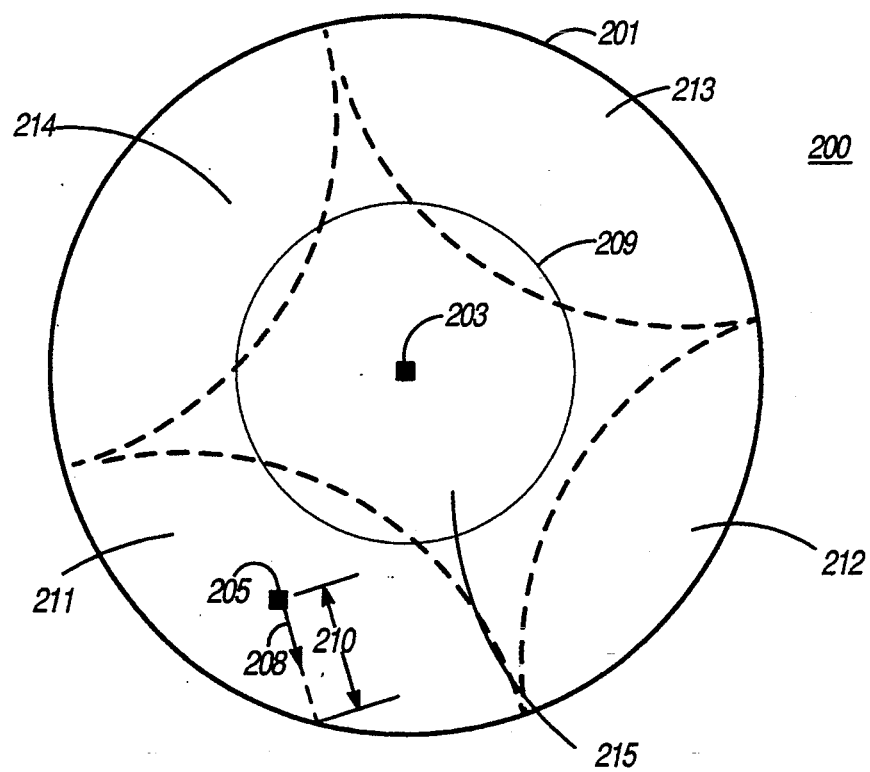
FIG. 2 shows a graphical representation depicting the relevant parameters for a trunked communication system which might employ a method of responding to service resource requests, in accordance with the present invention.

FIG. 2 shows a graphical representation of a trunked radio communication system 200. Coverage areas 201, 209 are serviced by a communication site from central location 203. A communication unit at location 205 makes a request for a particular service to place a call (e.g., interconnect, data transmission). At the time the service request is transmitted, the communication unit is moving at a speed and direction indicated by directional vector 208. That is, assuming that the communication unit's speed and direction do not change, the communication unit will be outside coverage area 201 in a time designated as time 210. This time, referred to as the available site time (AST), is an estimated value which describes an upper time limit in which a call can be successfully completed. Of course, if the vehicle changes speed and/or direction during the course of the call, the AST will be affected.

In addition to a directional vector, the communication units current location (e.g., location 205) must be known by the controller at the communication site.

This information can be obtained using well known techniques such as Loran-C, global positioning systems (GPS), etc. With regard to the information required to determine a directional vector 208, the present invention contemplates two alternate embodiments. A first embodiment requires that the communication unit has the ability to determine its current speed and direction, and transmit that information to the communication site. A second embodiment requires that the communication site keeps historical location information, and derives a probable directional vector based on two or more successive location points (i.e., a relatively simple calculation can be made to estimate a nominal speed and direction for a communication unit traveling from one point to another within a known time). It should be noted that either of these directional vectors can be updated on a continual basis to provide a more accurate indication of the communication units movement about the coverage area.

In addition to the AST value, a nominal service duration (NSD) is used to estimate how long a particular call is expected to take. The NSD for each service type (and optionally for each communication unit in the system) is stored at the communication site. That is, for each of the available service types, there is stored a nominal service duration value that applies to all the users of the system, a predetermined group of users, or even a unique NSD for each individual user in the system.

Lastly, the present invention considers the land topology of the geographic region in which the coverage area lies. Coverage area 201, for example, comprises geographic regions 211-215, which regions may have different topological characteristics. Accordingly, the quality level of communication service available in these regions may vary. These variations are described using coverage factors, which factors are stored at the communication site. Additionally, performance thresholds for each of the service types are stored at the communication site. That is, for each service type, a minimum coverage factor may be required to ensure reliable transmission of the information using the service resource corresponding to that service type. As an example, a minimum performance threshold for a voice call might be significantly lower than that for a fax transmission (since a small amount of transmission error is acceptable and may not be detected by the user at the receiving end). The present invention contemplates the use of the geographic coverage factors as well as the minimum performance thresholds to make a more accurate prediction of a completion probability for the requested call.

Figure 3:
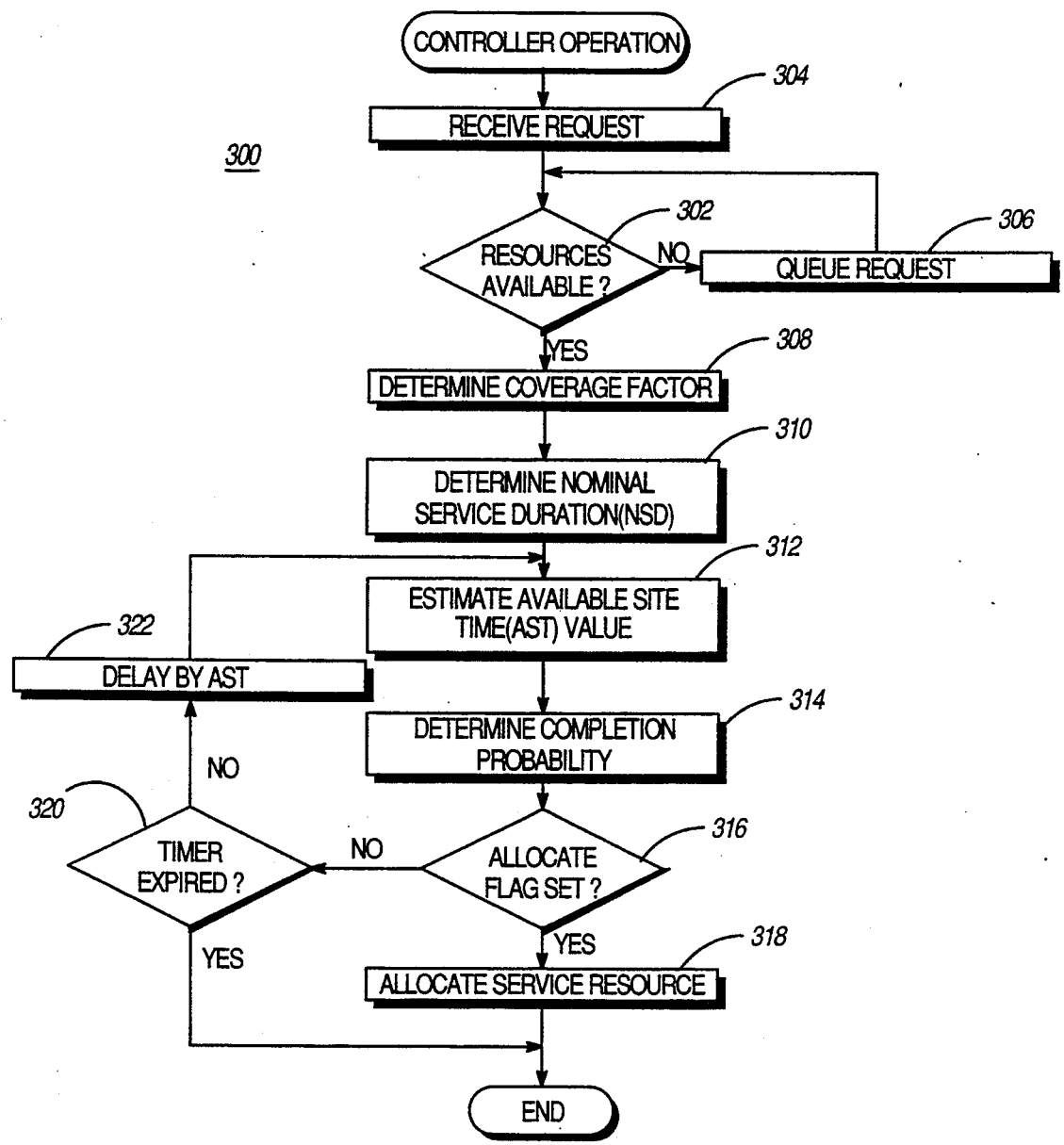
FIG. 3 shows a simplified flow diagram depicting the operation of a communication site controller, in accordance with the present invention.

FIG. 3 shows a flow diagram 300 depicting the controller operation in accordance with the present invention. After a request is received (302) a decision is reached (304) to determine whether or not the requested resource type is available. If not the request is queued (306) until a resource becomes available, as is well known in the art. If the resource requested is available, a preliminary coverage factor is determined (308). This coverage factor includes the available transmission power for the requesting communication unit, geographical topology of the region in which the communication unit is located, as well as any minimum performance threshold for the service being requested. The NSD is then determined (310), and the AST value is estimated (312). The completion probability is then determined (314), which process is later described. A decision is then reached (316) to determine whether or not the allocate flag has been set. If the allocate flag is set, the service resource is allocated (318) and the routine is exited, If the allocate flag is clear, a decision is reached (320) to determine whether or not the system timer has expired. If the timer has expired (i.e., the system can no longer queue the pending request), the routine is exited. If the timer has not expired, the routine is delayed by a time equivalent to the AST value, before the request is re-evaluated beginning with the process 312.

Figure 4:
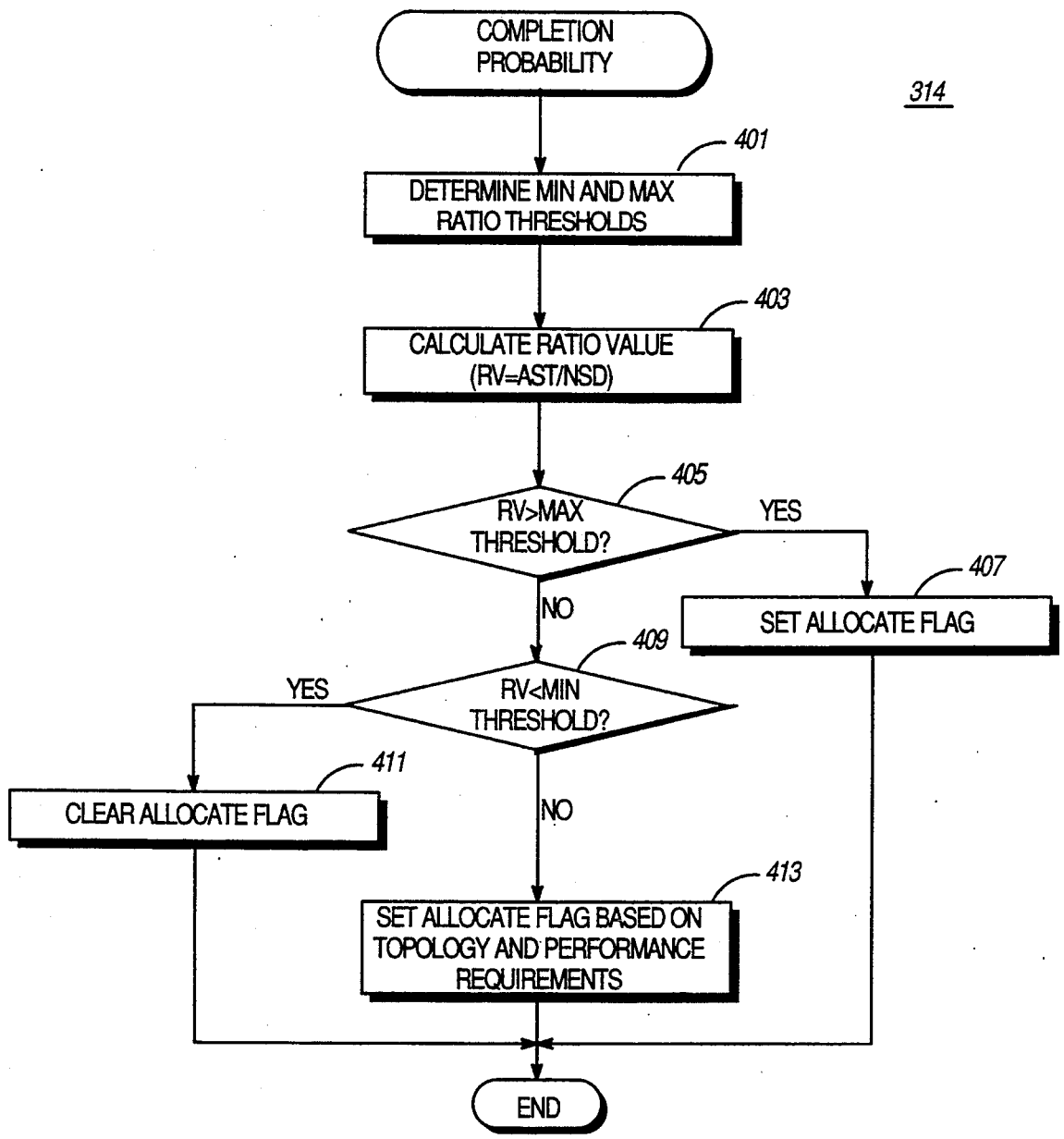
FIG. 4 shows a more detailed flow diagram depicting the routine used to determine the completion probability, in accordance with the invention.

FIG. 4 shows a flow diagram 314 which depicts the routine used to determine completion probability. The routine begins by determining (401) the minimum and maximum ratio thresholds. That is, based on historical information, the system designer might pick for each of the available service types, minimum and maximum thresholds to assist in the decision as to whether or not to allocate the requested resource. In particular, a minimum ratio threshold represents the lowest ratio in which a resource might still be allocated, while the maximum ratio threshold represents a ratio beyond which the service resource is automatically allocated. The ratio value is then calculated (403) as the ratio of the available site time and the nominal service duration. A decision is then reached (405) to determine whether or not the ratio value exceeds the maximum threshold. If so, the allocate flag is set (407), and the routine is exited. If not, a decision is reached (409) to determine whether or not the ratio value falls beneath the minimum threshold. If so, the allocate flag is cleared (411) and the routine is exited. If the ratio value falls between the minimum threshold and the maximum threshold, the allocate flag is set (413) based on the current topology and performance requirements which apply to the service request. That is, depending on where the communication unit is at the time the service resource is requested and what level of performance is required by that service type, the controller at the communication site may or may not elect to allocate the requested service resource to the requesting communication unit at that time. As an example, even if a call will likely be completed, if the requesting unit is located in a poor transmission region, the resource allocator may defer the request until the unit is in a better transmission region. Similarly, if a voice call is requested, the controller may allocate a resource to the requesting unit even if there is a chance the call will not be completed. Of course, the foregoing examples are intended to illustrate a small number of possible scenarios, and the operating parameters (e.g., thresholds, performance requirements) can be adjusted to accommodate the most likely scenarios for a particular system.

What is claimed is:

1. In a radio communication system having a communication site that covers at least a coverage area, the communication site allocating a plurality of service resources among a plurality of communication units located within the coverage area, a method of responding, at the communication site, to a service request identifying a requested service and transmitted from a requesting communication unit, the method comprising the steps of:

A) determining a nominal service duration for the requested service;

B) estimating an available site time value for the requesting communication unit;

C) calculating a completion probability value using the available site time value and the nominal service duration; and D) determining, based at least in part on the completion probability value, whether or not to allocate, to the requesting communication unit, a service resource corresponding to the requested service.

2. A method of responding to the service request as recited in claim 1, wherein step A) comprises the steps of:

A1) storing service duration values for each communication unit being serviced by the communication site;

A2) retrieving stored service duration values for the requesting communication unit; and A3) using the retrieved service duration values to determine the nominal service duration.

3. A method of responding to the service request as recited in claim 1, further comprising the step of:

E) receiving, from the communication unit, current location information describing where the communication unit is located when the service request is transmitted.

4. A method of responding to the service request as recited in claim 3, wherein step B) comprises the steps of:

B1) receiving, from the requesting communication unit, current speed and direction data;

B2) calculating a directional vector based on the received current speed and direction data; and B3) using the current location information and the directional vector to estimate the available site time value.

5. A method of responding to the service request as recited in claim 3, wherein step B) comprises the steps of:

B1) receiving, from the requesting communication unit, a directional vector describing the speed and direction of the requesting communication unit when the service request is transmitted; and B2) using the current location information and the directional vector to estimate the available site time value.

6. A method of responding to the service request as recited in claim 3, wherein step B) comprises the steps of:

B1) storing location information for each communication unit being serviced by the communication site;

B2) retrieving stored location information for the requesting communication unit;

B3) using the retrieved location information and the current location information to determine a probable directional vector; and B4) using the current location information and the probable directional vector to estimate the available site time value.

7. A method of responding to the service request as recited in claim 1, wherein step D) comprises the step of:

D1) when the completion probability value exceeds a maximum threshold, allocating the service resource to the requesting communication unit.

8. A method of responding to the service request as recited in claim 1, wherein step D) comprises the step of:

D1) when the completion probability value falls below a maximum threshold, deferring allocation of the service resource to the requesting communication unit until a future time.

9. A method of responding to the service request as recited in claim 8, wherein step D1) comprises the step of:

D1a) delaying a time equivalent to the available site time value before determining whether or not to allocate the service resource to the requesting communication unit.

10. A method of responding to the service request as recited in claim 8, further comprising the steps of:

D2) when the completion probability value exceeds a maximum threshold, allocating the service resource to the requesting communication unit; and E) when the completion probability value falls between the maximum threshold and the minimum threshold, determining an expected performance level for a subsequent transmission.

11. A method of responding to the service request as recited in claim 10, wherein step E) comprises the steps of:

E1) storing expected performance levels for a plurality of geographic regions located within the coverage area;

E2) determining a current geographic region in which the requesting communication unit is located; and E3) retrieving the expected performance level corresponding to the current geographic region.

12. A method of responding to the service request as recited in claim 10, further comprising the steps of:

F) determining a minimum performance threshold value for the service resource corresponding to the requested service; and G) determining, based at least in part on a comparison between the minimum performance threshold value and the expected performance level, whether or not to allocate the service resource to the requesting communication unit.

13. A method of responding to the service request as recited in claim 10, further comprising the steps of:

F) storing minimum performance threshold values for each of the plurality of service resources;

G) retrieving the minimum performance threshold value for the service resource corresponding to the requested service;

H) determining, based at least in part on a comparison between the retrieved threshold value and the expected performance level, whether or not to allocate the service resource to the requesting communication unit.

14. In a radio communication system having a communication site that covers at least a coverage area, the communication site allocating a plurality of service resources among a plurality of communication units located within the coverage area, a method of responding, at the communication site, to a service request identifying a requested service and transmitted from a requesting communication unit, the method comprising the steps of:

A) determining a nominal service duration for the requested service;

B) estimating an available site time value for the requesting communication unit;

C) calculating a completion probability value using the available site time value and the nominal service duration;

D) when the completion probability value exceeds a maximum threshold, allocating the service resource to the requesting communication unit; and E) when the completion probability value falls below a minimum threshold, deferring allocation of the service resource to the requesting communication unit until a future time.

15. A method of responding to the service request as recited in claim 14, wherein step E) comprises the step of:

E1) delaying a time equivalent to the available site time value before determining whether or not to allocate the service resource to the requesting communication unit.

16. A method of responding to the service request as recited in claim 14, further comprising the steps of:

F) when the completion probability value falls between the first predetermined threshold and the second predetermined threshold, determining an expected performance level for a subsequent transmission;

G) determining a minimum performance threshold value for the service resource corresponding to the requested service; and H) determining, based at least in part on a comparison between the minimum performance threshold value and the expected performance level, whether or not to allocate the service resource to the requesting communication unit.

17. In a radio communication system having a communication site that covers at least a coverage area, the communication site allocating a plurality of service resources among a plurality of communication units located within the coverage area, a method of responding, at the communication site, to a service request identifying a requested service and transmitted from a requesting communication unit, the method comprising the steps of:

A) determining a nominal service duration for the requested service;

B) estimating an available site time value for the requesting communication unit;

C) calculating a completion probability value using the available site time value and the nominal service duration;

D) when the completion probability value exceeds a maximum threshold, allocating the service resource to the requesting communication unit;

E) when the completion probability value falls below a minimum threshold, deferring allocation of the service resource to the requesting communication unit until a future time;

F) when the completion probability value falls between the maximum threshold and the minimum threshold;

F1) determining an expected performance level for a subsequent transmission;

F2) determining a minimum performance threshold value for the service resource corresponding to the requested service; and F3) determining, based at least in part on a comparison between the minimum performance threshold value and the expected performance level, whether or not to allocate the service resource to the requesting communication unit.

18. A method of responding to the service request as recited in claim 17, further comprising the step of:

I) receiving, from the communication unit, current location information describing where the communication unit is located when the service request is transmitted; and wherein step F) comprises the steps of:

F1) storing expected performance levels for a plurality of geographic regions located within the coverage area;

F2) using the current location information to determine a current geographic region in which the requesting communication unit is located; and F3) retrieving the expected performance level corresponding to the current geographic region.

* * * * *

UNITED STATES PATENT AND TRADEMARK OFFICE
CERTIFICATE OF CORRECTION

PATENT NO. : 5,423,066
DATED : June 6, 1995
INVENTOR(S) : Michael D. Sasuta

It is certified that error appears in the above-indentified patent and that said Letters Patent is hereby corrected as shown below:

ON THE TITLE PAGE

In the Abstract, line 12, the word "completetion" should be --completion--.
Column 5,
In claim 8, line 68, the word "maximum" should be --minimum--.

Signed and Sealed this

Tenth Day of October, 1995

Attest:

BRUCE LEHMAN

Attesting Officer      *Commissioner of Patents and Trademarks*